US011643228B1

(12) United States Patent
New et al.

(10) Patent No.: US 11,643,228 B1
(45) Date of Patent: May 9, 2023

(54) MODULAR CONTAINERIZATION SYSTEMS AND METHODS

(71) Applicant: Amazon Technologies, Inc., Seattle, WA (US)

(72) Inventors: Elliot New, Congleton (GB); Daniel Lange, Leipzig (DE); Andrew Owen Roberts, Nantwich (GB)

(73) Assignee: Amazon Technologies, Inc., Seattle, WA (US)

( * ) Notice: Subject to any disclaimer, the term of this patent is extended or adjusted under 35 U.S.C. 154(b) by 331 days.

(21) Appl. No.: 16/580,539

(22) Filed: Sep. 24, 2019

(51) Int. Cl.
*B65B 5/06* (2006.01)
*B65B 61/28* (2006.01)
*G01G 23/18* (2006.01)

(52) U.S. Cl.
CPC .............. *B65B 5/067* (2013.01); *B65B 61/28* (2013.01); *G01G 23/18* (2013.01)

(58) Field of Classification Search
USPC .......................................................... 53/452
See application file for complete search history.

(56) References Cited

U.S. PATENT DOCUMENTS

| 4,783,740 | A * | 11/1988 | Ishizawa | G06Q 10/087 705/28 |
| 8,952,284 | B1 * | 2/2015 | Wong | G05B 15/02 209/586 |
| 10,001,402 | B1 * | 6/2018 | Gyori | G01G 21/22 |
| 2003/0116484 | A1 * | 6/2003 | Takizawa | B65G 1/137 209/630 |
| 2008/0091574 | A1 * | 4/2008 | Hamaji | G06Q 10/087 705/28 |
| 2011/0016026 | A1 * | 1/2011 | Godlewski | G06Q 10/0875 705/28 |
| 2013/0261792 | A1 * | 10/2013 | Gupta | G06Q 30/06 700/232 |

* cited by examiner

*Primary Examiner* — Chinyere J Rushing-Tucker
(74) *Attorney, Agent, or Firm* — Athorus, PLLC (57) ABSTRACT

Modular containerization systems and methods may include a plurality of modular units that may be removably coupled together in various configurations. Each modular unit may receive a container, and each container may receive one or more objects. In addition, each modular unit may include various sensors and processing aid or indicators, such as a container presence sensor, a scale, a stow-to-light indicator, a container complete button and indicator, and a container removal indicator. Further, each modular unit of a modular container system may be in communication with a controller to coordinate various processes associated with the system, including container placement, container filling, and container removal processes using the various sensors and processing aids or indicators.

17 Claims, 7 Drawing Sheets

MODULAR CONTAINERIZATION SYSTEMS AND METHODS

BACKGROUND

Many companies may store, package, and ship items and/or groups of items from material handling facilities. For example, many companies may store items in a material handling facility and ship items to various destinations (e.g., customers, stores) from the material handling facility. Various material handling systems and processes, including receipt, sorting, storage, packing, shipping, or other processing of items within a material handling facility, often incur significant cost and time. Accordingly, there is a need for modular, flexible, and automated systems and methods to facilitate the various material handling processes within a material handling facility, thereby improving the speed, adaptability, and efficiency of such processes.

DETAILED DESCRIPTION

As is set forth in greater detail below, implementations of the present disclosure are directed to modular containerization systems and methods to facilitate sorting, grouping, packing, storage, shipping, or other processes associated with a material handling facility.

In example embodiments, a modular containerization system may include one or more modular units, or storage units. Each of the modular units may comprise a frame that is configured to receive a bag, tote, box, or other container that may receive one or more objects. In addition, the one or more objects may comprise packages, boxes, items, products, or other types of objects that may be sorted, grouped, packaged, stored, and/or shipped. Further, the various bags, totes, boxes, or containers that may be placed within the modular units may be configured to receive objects via lateral side or end surfaces, rather than top or upper surfaces, of the bags, totes, boxes, or containers.

In some example embodiments, each of the one or more modular units may include various types of sensors, including a bag or container presence sensor to detect the presence or absence of a bag within the modular unit, and a scale to measure a weight of one or more objects placed within the bag. In addition, a display may be associated with the scale to provide a visual indication to one or more agents of the weight of objects placed within a bag.

In further example embodiments, each of the one or more modular units may include various processing aids or indicators, including a stow-to-light indicator that directs placement of one or more objects in particular bags of the one or more modular units, a container complete (or bag full) button and indicator that may be pressed upon completion of placement of objects within a particular bag, and a container removal (or bag removal) indicator that indicates that a particular bag is complete and may be removed from the modular unit. In some example embodiments, the stow-to-light indicator and the bag full button may be associated with a front or first face of the modular unit, and the bag removal indicator may be associated with a rear or second face of the modular unit, such that various processes such as bag placement, bag filling, and/or bag removal may be performed by one or more agents substantially concurrently or in parallel. As used herein, the term agents may refer to human agents, robotic arms, machines, or systems, other automated machinery or equipment, or other material handling equipment capable of performing the various processes.

In example embodiments, each of the one or more modular units may be electrically connected to and in communication with a controller or control box associated with the modular containerization system. Various of the different types of sensors and the different processing aids or indicators may be electrically connected to and in communication with the controller to send and receive commands, instructions, and/or data, and/or to receive power. In other example embodiments, one or more of the different types of sensors and the different processing aids or indicators may include respective dedicated power sources, and/or may have respective dedicated communication devices or components. Further, each of the one or more modular units, whether electrically connected to the controller of the modular containerization system or operating at least partially independently, may be in communication with a material handling system controller or warehouse management system to coordinate operations of the modular containerization system, the one or more modular units, and/or various upstream and/or downstream stations or processes.

Figure 1:
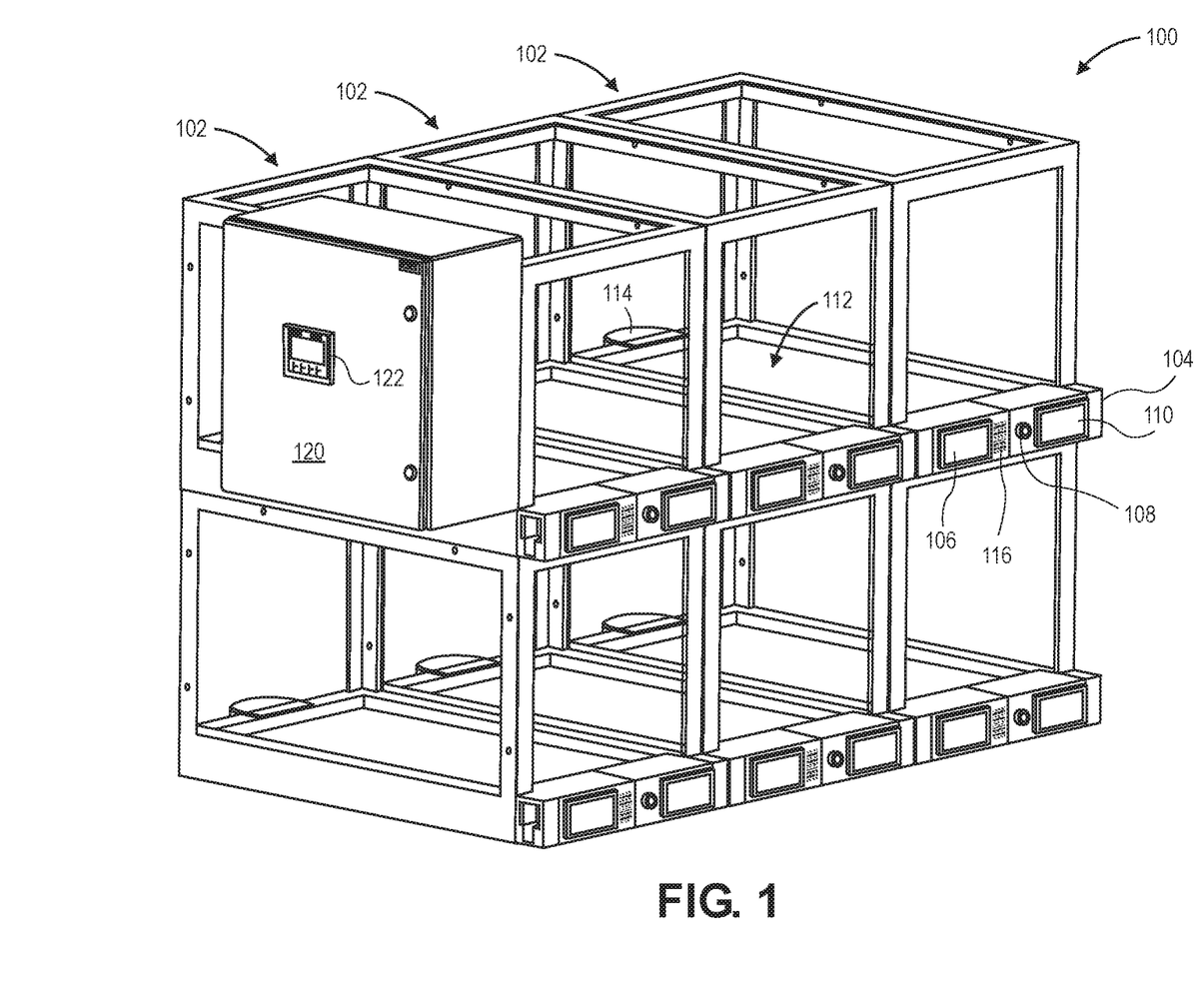
FIG. 1 is a front, perspective view diagram of an example modular containerization system, in accordance with implementations of the present disclosure.

FIG. 1 is a front, perspective view diagram of an example modular containerization system 100, in accordance with implementations of the present disclosure.

The example modular containerization system 100 may include a plurality of modular units 102 (or storage units). For example, as shown in FIG. 1, the system 100 may include six modular units 102. Any other number of modular units 102 may be combined to form a system 100, including four, ten, sixteen, twenty, twenty-four, or other numbers of modular units 102.

Each modular unit 102 may include a frame. For example, the frame may be shaped substantially as a cube or rectangular prism. The frame may also have other shapes, such as cylindrical, trapezoidal, hexagonal prism, octagonal prism, or other prismatic, regular, or irregular shapes, as well as other sizes, in order to receive various types or sizes of containers. In this regard, each modular unit 102 may receive various types or sizes of containers, such as bags, totes, boxes, or other containers. Further, the various bags, totes, boxes, or containers that may be placed within the modular units may be configured to receive objects via lateral side or end surfaces, rather than top or upper surfaces, of the bags, totes, boxes, or containers. In example embodiments, the frame may be formed from steel, aluminum, other metals, plastics, composites, other materials, or combinations thereof.

In addition, each modular unit 102 may be coupled to one or more adjacent modular units 102 by various means, such as fasteners, adhesives, brackets, clips, snaps, interlocking features, tongues and grooves, frictional connections, interference connections, or other means. By coupling two or modular units 102 together to form a system 100 in various configurations, the modular units 102 may be flexibly combined to form various sizes and shapes of modular containerization systems 100, e.g., in order to be formed, placed, and used in areas having limited space and/or in order to meet processing requirements such as speed, throughput, or efficiency.

Further, each modular unit 102 may include a front or first face 104 and a rear or second face 114. The first and second faces 104, 114 may be opposite, end faces of the modular unit 102, or in other example embodiments, the first and second faces 104, 114 may comprise different combinations of faces of the modular unit 102. The first face 104 may include a display 106 that is in communication with a scale 112 associated with a base of the frame of the modular unit 102, a container complete (or bag full) button and indicator 108, a stow-to-light indicator 110, and a modular unit identifier 116, each of which will be described in more detail at least with respect to FIG. 2. In addition, the second face 114 may include a container removal (or bag removal) indicator 315 and the modular unit identifier 116, each of which will be described in more detail at least with respect to FIG. 3.

Furthermore, each modular unit 102 of the modular containerization system 100 may be electrically connected to and/or in communication with a controller or control box 120 that is associated with the system 100. For example, each modular unit 102 may be electrically connected, e.g., via wired or wireless connection, to send and receive commands, instructions, and/or data to and from the controller 120. In addition, each modular unit 102 may be electrically connected, e.g., via wired connection, to receive power from the controller 120, or from a power source connected via the controller 120, such as a mains power source of a material handling facility. In this regard, the scale 112 and display 106 of a modular unit 102 may communicate with the controller 120 to send and receive data associated with weights of objects, the container complete button 108 and/or container removal indicator 315 may communicate with the controller 120 to coordinate placement, filling, and/or removal of containers, and/or the stow-to-light indicator 110 may communicate with the controller 120 to direct placement of objects by agents in particular containers associated with modular units 102.

In example embodiments in which a modular unit 102 is electrically connected via wired connection to the controller 120, one or more wires may be routed through the first face 104 of the modular unit 102, and potentially through respective first faces 104 of adjacent modular units 102, to the controller 120. In addition, one or more wires may be routed through or under a base of the modular unit 102 between the first face 104 and the second face 114, e.g., to provide a wired, electrical connection between the container complete button 108 of the first face 104 and the container removal indicator 315 of the second face 114, and/or to provide a wired, electrical connection between the display 106 of the first face 104 and the scale 112 of the base of the frame.

Further, one or more wires may be routed through or under a base of the modular unit 102, and potentially through or under respective bases of adjacent modular units 102, to the controller 120. Moreover, one or more wires may be routed through the second face 114 of the modular unit 102, and potentially through respective second faces 114 of adjacent modular units 102, to the controller 120.

In further example embodiments, instead of routing wires through first faces 104, through second faces 114, and/or through or under bases of the modular units 102, ends or sides of the first faces 104 and/or second faces 114, and/or portions of the frames themselves, may include electrical connectors that are placed in contact and coupled upon attaching two or more modular units 102 together to form a system 100. The electrical connectors may be formed and configured to transfer data and/or power between adjacent modular units 102 and with the controller 120, thereby eliminating the need to physically and/or manually route wires between individual modular units 102 and the controller 120.

The controller 120 may also include a display or configuration screen 122 that may be used to configure the modular units 102 of the system 100, configure respective sensors associated with the modular units 102, configure container complete and container removal indications and operations of the modular units 102, configure stow-to-light indicators of the modular units 102, configure respective scales 112 and displays 106 of the modular units 102, reset one or more aspects of operations of the modular units 102 and the system 100, and/or perform other functions or operations. In one example embodiment, the display or configuration screen 122 may include a selectable option to reset the container complete buttons and container removal indicators to a steady, always-on illumination such that one or more objects may be placed in a container, e.g., responsive to an erroneous or accidental pressing of a container complete button when the container associated with the modular unit may not actually be determined to be full or complete.

In other example embodiments, instead of receiving power via an electrical connection via the controller 120, one or more modular units 102, or components thereof, may include dedicated, or backup, power sources associated with the modular units 102, or components thereof. For example, the scale 112 and display 106 of a modular unit 102 may have a dedicated or backup power source, the container complete button 108 and/or container removal indicator 315 may have dedicated or backup power sources, and/or the stow-to-light indicator 110 may have a dedicated or backup power source.

In further example embodiments, in addition to or instead of a communication connection with the controller 120, one or more modular units 102, or components thereof, may include communication devices to communicate with a material handling system controller or warehouse management system associated with a facility in which the system 100 and modular units 102 are operating. For example, the scale 112 and display 106 of a modular unit 102 may communicate with a warehouse management system to send and receive data associated with weights of objects, the container complete button 108 and/or container removal indicator 315 may communicate with a warehouse management system to coordinate placement, filling, and/or removal of containers, and/or the stow-to-light indicator 110 may communicate with a warehouse management system to direct placement of objects in particular containers associated with modular units 102.

In some example embodiments, a single controller 120 may be electrically connected, e.g., via wired or wireless connections, to a plurality of modular units 102 to provide power to one or more components of the modular units 102, and/or to coordinate operations of the modular units 102 of the system 100 for sorting, grouping, packing, storage, shipping, or other processes associated with a material handling facility.

Figure 2:
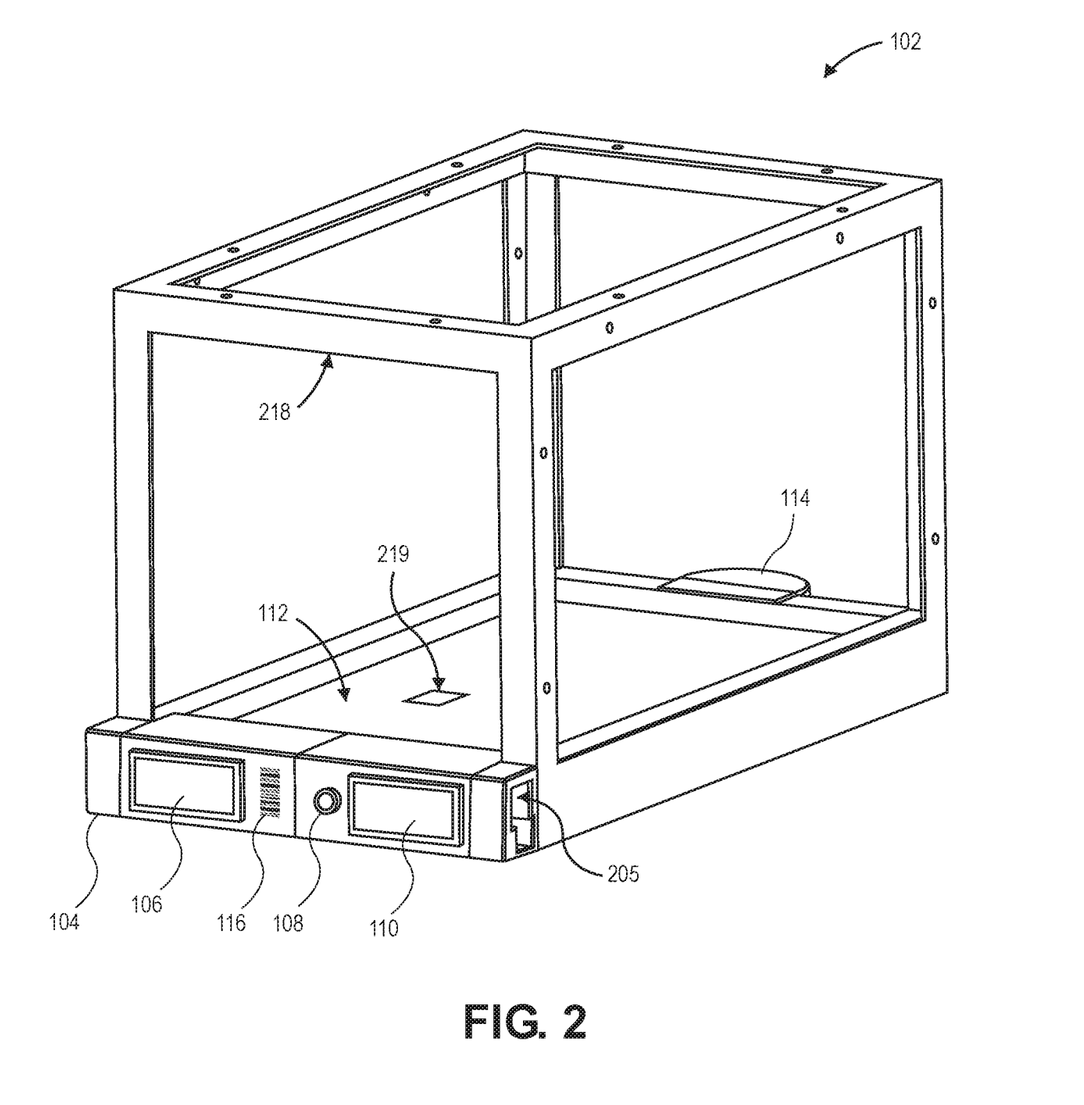
FIG. 2 is a front, perspective view diagram of an example modular unit of an example modular containerization system, in accordance with implementations of the present disclosure.
Figure 3:
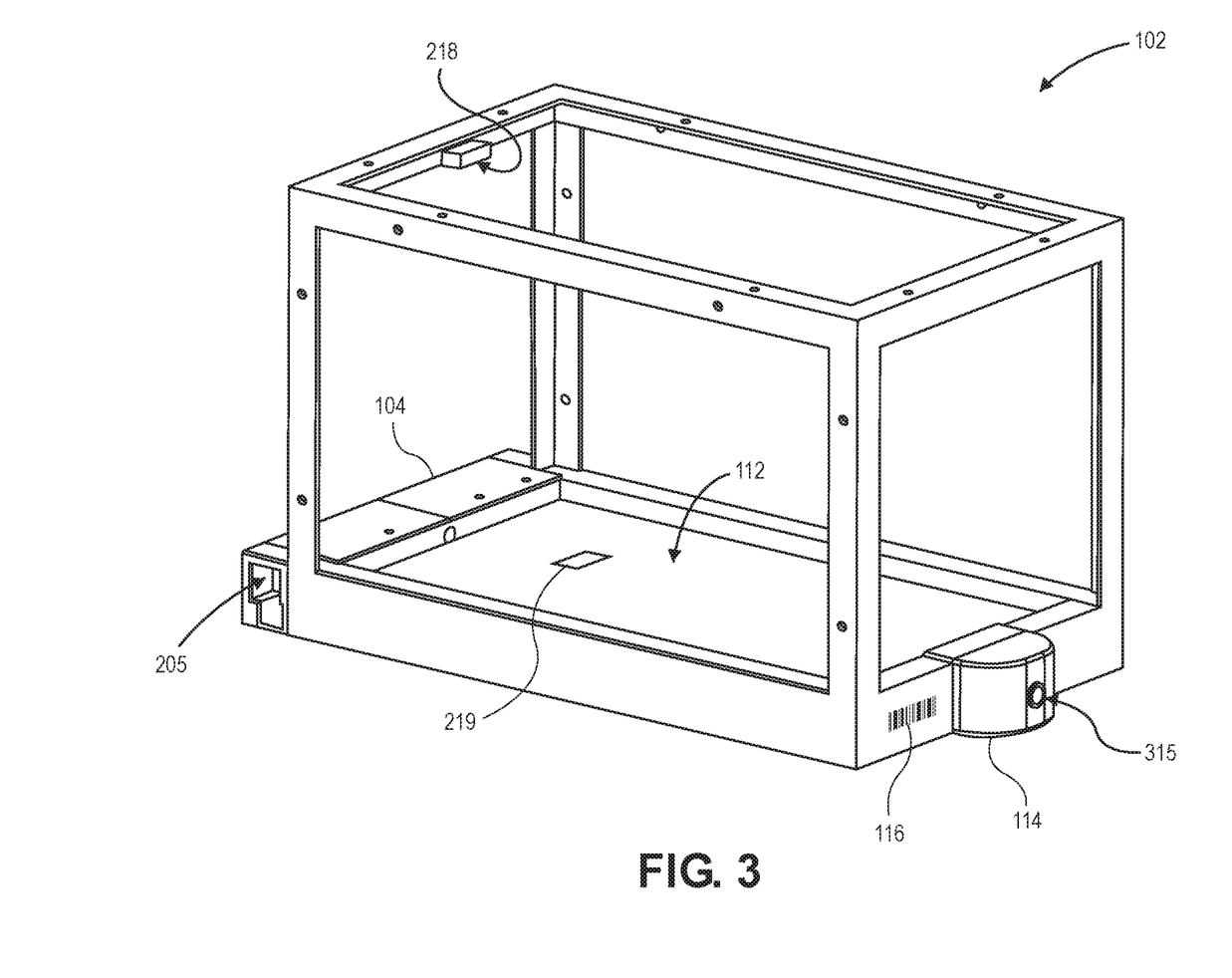
FIG. 3 is a rear, perspective view diagram of an example modular unit of an example modular containerization system, in accordance with implementations of the present disclosure.

FIG. 2 is a front, perspective view diagram of an example modular unit 102 of an example modular containerization system 100, in accordance with implementations of the present disclosure, and FIG. 3 is a rear, perspective view diagram of an example modular unit 102 of an example modular containerization system 100, in accordance with implementations of the present disclosure.

Each modular unit 102 may include a front or first face 104 and a rear or second face 114. The first and second faces 104, 114 may be opposite, end faces of the modular unit 102, or in other example embodiments, the first and second faces 104, 114 may comprise different combinations of faces of the modular unit 102. The first face 104 may include a display 106 that is in communication with a scale 112 associated with a base of the frame of the modular unit 102, a container complete (or bag full) button and indicator 108, a stow-to-light indicator 110, and a modular unit identifier 116. The second face 114 may include a container removal (or bag removal) indicator 315 and the modular unit identifier 116. The modular unit identifier 116 may comprise a barcode, quick response (QR) code, number, symbol, character, or other identifier that is unique to each particular modular unit 102, in order to individually identify modular units 102 of a system 100. Further, each modular unit 102 may also include a container presence (or bag presence) sensor 218 and a corresponding reflective surface 219.

The scale 112 may comprise any type of scale or weight measurement device that can detect the weight of a container within the frame of the modular unit 102 and/or one or more objects placed in the container. The scale 112 may be electrically connected to the display 106 to indicate a current weight of the container and/or one or more objects placed therein. The display 106 may comprise any type of display, screen, monitor, touchscreen, or other visual output device. The display 106 and the scale 112 may communicate with the controller 120 via wired or wireless connections, and the display 106 and the scale 112 may receive power via the controller 120 and/or via a dedicated power source associated with the modular unit 102.

In some example embodiments, a container may be determined to be full or complete if the weight of one or more objects placed therein meets or exceeds 15 kilograms. In other example embodiments, a container may be determined to be full or complete if the weight of one or more objects placed therein meets or exceeds a different weight threshold, if no other objects can physically fit within the container, if a complete group or customer order of objects has been placed within the container, and/or based on any other threshold, grouping, or sorting of objects.

The container complete button and indicator 108 of the first face 104 may comprise a button to be pressed when a container is determined to be full or complete, as well as a visual indicator, such as a light or other illumination element, to indicate operation of the container complete button 108 responsive to detecting a container within the modular unit 102, and to indication activation of the container complete button 108 responsive to being pressed when a container is determined to be full or complete. For example, the container complete button 108 may have a steady, always-on illumination to indicate operation of the container complete button 108 responsive to detecting a container within the modular unit 102. In addition, the container complete button 108 may have a flashing or intermittent illumination to indicate activation of the container complete button 108 responsive to being pressed when a container is determined to be full or complete. In this manner, the steady illumination of the container complete button 108 may indicate that objects may be placed in a container within the modular unit 102, and the flashing illumination of the container complete button 108 may indicate that the container is full or complete.

The container removal indicator 315 of the second face 114 may comprise a visual indicator, such as a light or other illumination element, to indicate operation of the container removal indicator 315 responsive to detecting a container within the modular unit 102, and to indication activation of the container removal indicator 315 responsive to the container complete button 108 being pressed when a container is determined to be full or complete. For example, the container removal indicator 315 may have a steady, always-on illumination to indicate operation of the container removal indicator 315 responsive to detecting a container within the modular unit 102. In addition, the container removal indicator 315 may have a flashing or intermittent illumination to indicate activation of the container removal indicator 315 responsive to the container complete button 108 being pressed when a container is determined to be full or complete. In this manner, the steady illumination of the container removal indicator 315 may indicate that objects may be placed in a container within the modular unit 102, and the flashing illumination of the container removal indicator 315 may indicate that the container is full or complete and ready for removal from the modular unit 102.

For example, upon activation of the container removal indicator 315 responsive to the container complete button 108 being pressed when a container is determined to be full or complete, the container determined to be full or complete may be removed from the modular unit 102. In addition, the container complete button 108 and the container removal indicator 315 may stop flashing or intermittently illuminating and transition to a steady, always-off state responsive to removal of the container from the modular unit 102, e.g., based on an absence of a container detected by a container presence sensor 218 as described herein. Further, responsive to scanning a barcode, QR code, number, symbol, character, or other identifier 116 associated with the particular modular unit, e.g., the identifier 116 of the second face 114 shown in FIG. 3, a label to be placed on the container may be printed or generated by a printing device. Moreover, an agent may be instructed to apply the label to the container and transfer the container to a downstream station or process, e.g., packing, storage, shipping, or other processes.

The container complete button and indicator 108 and the container removal indicator 315 may be electrically connected to each other, e.g., via wired connections through or under a base of the frame of the modular unit 102, via wired connections through the controller 120, or via wireless connections. In addition, the container complete button and indicator 108 and the container removal indicator 315 may communicate with the controller 120 via wired or wireless connections, and the container complete button and indicator 108 and the container removal indicator 315 may receive power via the controller 120 and/or via a dedicated power source associated with the modular unit 102.

The stow-to-light indicator 110 may also comprise a visual indicator, such as a light or other illumination element, to indicate a particular modular unit and corresponding container in which one or more objects should be placed. For example, responsive to scanning a barcode, QR code, number, symbol, character, or other identifier associated with an object, a stow-to-light indicator 110 associated with a particular modular unit and corresponding container in which the scanned object should be placed may illuminate, flash, or otherwise provide a visual indication. Then, upon placing the scanned object in the particular modular unit and corresponding container and further responsive to scanning a barcode, QR code, number, symbol, character, or other identifier 116 associated with the particular modular unit, e.g., the identifier 116 of the first face 104 shown in FIG. 2, the stow-to-light indicator 110 associated with the particular modular unit and corresponding container in which the scanned object was placed may stop illuminating, flashing, or otherwise providing a visual indication.

The stow-to-light indicator 110 may communicate with the controller 120 via wired or wireless connections, and the stow-to-light indicator 110 may receive power via the controller 120 and/or via a dedicated power source associated with the modular unit 102. In addition, the stow-to-light indicator 110 may communicate with a material handling system controller or warehouse management system directly or via the controller 120, e.g., via wired or wireless connections, in order to determine particular modular units and corresponding containers in which scanned objects should be placed based on data associated with the scanned objects and/or data associated with the particular modular units.

The first face 104 may also include a channel or conduit 205 through which one or more wires may extend and/or be routed in order to electrically connect two or more modular units 102 together with a controller 120 to form a modular containerization system. In alternative example embodiments, instead of a channel or conduit 205, ends of the first face 104 may comprise electrical connectors that may contact and couple with corresponding electrical connectors of adjacent modular units 102 to form a system 100. The electrical connectors may be formed and configured to transfer data and/or power between adjacent modular units 102 and with the controller 120, thereby eliminating the need to physically and/or manually route wires between individual modular units 102 and the controller 120 via channels 205.

Each modular unit 102 may also include a container presence sensor 218 and corresponding reflective surface 219. The container presence sensor 218 may comprise a photoeye, proximity sensor, or other type of presence detection sensor, and the reflective surface 219 may comprise a reflective tape, patch, applique, or other surface that is within a field of view of the container presence sensor 218. For example, responsive to the reflective surface 219 being detected by or within the field of view of the container presence sensor 218, the container presence sensor 218 may determine that the modular unit 102 is in a first state, e.g., absence of a container. In addition, responsive to the reflective surface 219 being undetected by or blocked or occluded from within the field of view of the container presence sensor 218, the container presence sensor 218 may determine that the modular unit 102 is in a second state, e.g., presence of a container.

In example embodiments, operations of the container complete button and indicator 108 and the container removal indicator 315 may be controlled based at least in part on a state of the modular unit detected by the container presence sensor 218. For example, responsive to the container presence sensor 218 detecting the presence of a container within the modular unit, the container complete button 108 and the container removal indicator 315 may have a steady, always-on illumination to indicate operation of the container complete button 108 and the container removal indicator 315 such that one or more objects may be placed in the container within the modular unit. In addition, responsive to the container presence sensor 218 detecting the absence of a container within the modular unit, the container complete button 108 and the container removal indicator 315 may have a steady, always-off illumination to indicate that the container complete button 108 and the container removal indicator 315 are not operational such that one or more objects should not be placed in the modular unit.

In further example embodiments, operations of the stow-to-light indicator 110 may also be controlled based at least in part on a state of the modular unit detected by the container presence sensor 218. For example, responsive to the container presence sensor 218 detecting the presence of a container within the modular unit, the stow-to-light indicator 110 may be operational, such that it may be activated to provide a visual indication to place one or more objects in the container within the modular unit. In addition, responsive to the container presence sensor 218 detecting the absence of a container within the modular unit, the stow-to-light indicator 110 may not be operational, such that it may not be activated to provide a visual indication to place one or more objects in the modular unit.

The container presence sensor 218 may communicate with the controller 120 via wired or wireless connections, and the container presence sensor 218 may receive power via the controller 120 and/or via a dedicated power source associated with the modular unit 102. In addition, the container presence sensor 218 may communicate with a material handling system controller or warehouse management system directly or via the controller 120, e.g., via wired or wireless connections, in order to provide data associated with particular modular units and corresponding containers in which scanned objects may be placed based on data associated with the scanned objects and/or data associated with the particular modular units.

In other example embodiments, various other types of sensors may be used to determine presence or absence of a container within a modular unit, e.g., imaging sensors, proximity or ranging sensors, radiofrequency identification (RFID) tag readers (that may detect corresponding RFID tags associated with containers), or other types of sensors. In further example embodiments, the container presence sensor 218 may be placed in other positions or orientations associated with the modular unit, so long as the container presence sensor 218 is positioned or oriented to detect the presence and absence of a container within the modular unit.

In still further example embodiments, the scale 112 may be used, in combination with or in place of the container presence sensor 218, to detect the presence and absence of a container within the modular unit based on a detected weight associated with a container. In addition, responsive to detecting the presence of a container by the container presence sensor, the scale 112 may be automatically tared, or zeroed out, in order to facilitate subsequent operations including detecting the weight of one or more objects placed within the container.

In additional example embodiments, the activations of the container complete button and indicator and the container removal indicator may be at least partially automated based on data associated with the scale, data associated with one or more objects, and/or data associated with a modular unit and corresponding container. For example, responsive to the scale detecting that the weight of one or more objects placed within a container meets or exceeds a weight threshold, the container may be determined to be full or complete, and the display associated with the scale may provide an alert or notification that the container is full or complete. Alternatively or in addition, the container complete button and indicator and container removal indicator may be automatically activated to direct removal of the container from the modular unit.

As another example, the controller and/or a warehouse management system in communication with the controller may maintain data associated with one or more objects placed within a container, and may determine that the container is full or complete based on the data associated with one or more objects that have been placed within the container. The data associated with the one or more objects may include identification, type, size, shape, weight, or other properties or characteristics of the one or more objects. Then, a display may provide an alert or notification that the container is full or complete. Alternatively or in addition, the container complete button and indicator and container removal indicator may be automatically activated to direct removal of the container from the modular unit. Furthermore, the determination that the container is full or complete based on data associated with one or more objects placed within a container may further be based on data received from a scale associated with weights of the one or more objects placed within the container.

The modular containerization systems and methods described herein may facilitate adaptable, fast, and efficient processing operations within a material handling facility, in which such operations may potentially include sorting, grouping, packing, storage, shipping, or other processes. The modular containerization systems may be formed from any number of modular units (or storage units) that may be connected or coupled together and sized or shaped to receive various types or sizes of containers and/or objects. Accordingly, the modular containerization systems of various sizes, shapes, and/or capacities may be quickly formed, installed in, and/or removed from various areas or spaces within a material handling facility to meet processing requirements.

Figure 4:
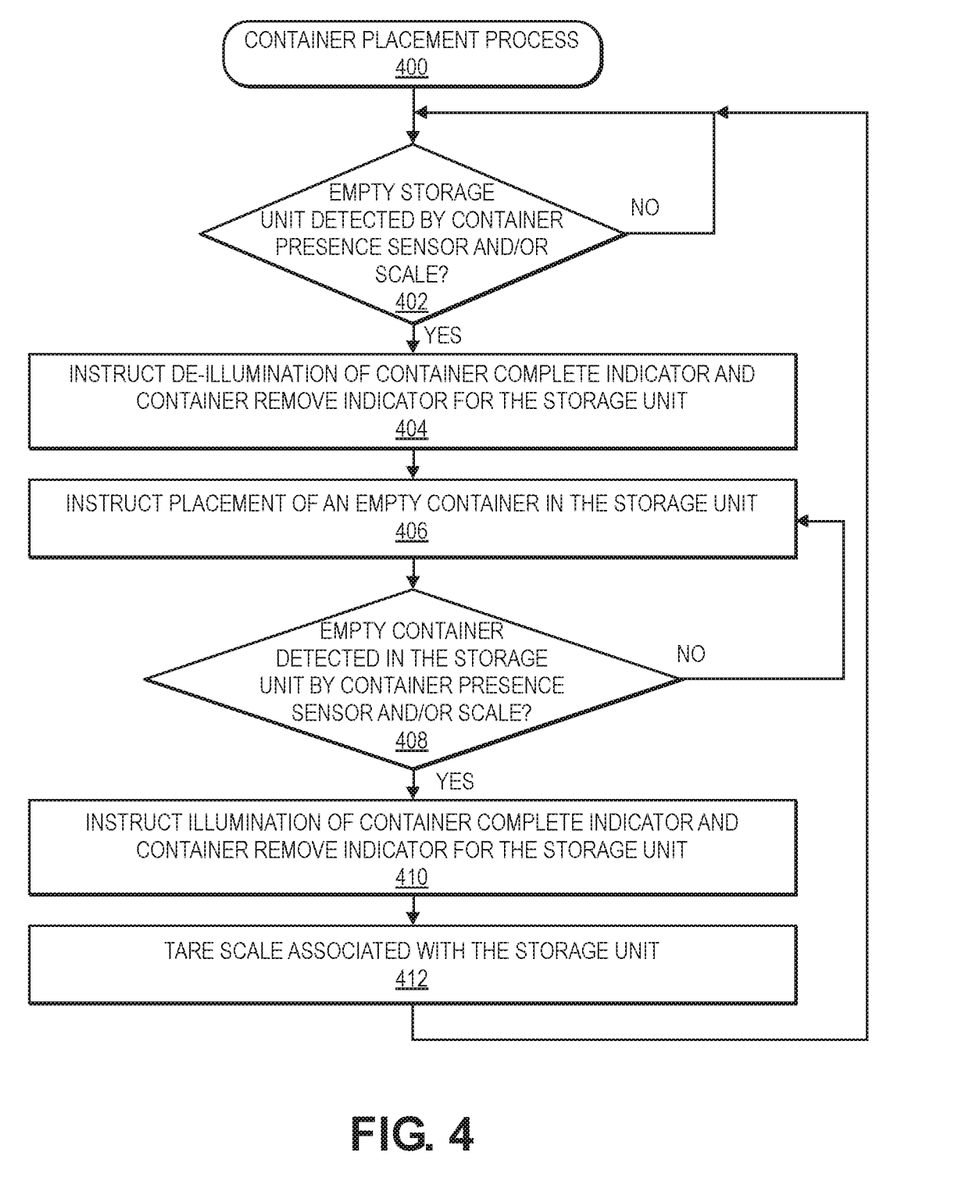
FIG. 4 is a flow diagram illustrating an example container placement process, in accordance with implementations of the present disclosure.

FIG. 4 is a flow diagram illustrating an example container placement process 400, in accordance with implementations of the present disclosure.

The process 400 may begin by determining whether an empty storage unit is detected by a container presence sensor and/or a scale, as at 402. For example, based on data received from a container presence sensor that indicates a presence or absence of a container within a modular unit, and/or based on data received from a scale that indicates a presence or absence of a container within a modular unit, a controller may determine whether a container is present within a particular modular unit. Various types of sensors may be associated with a modular unit to detect the presence or absence of a container within the modular unit.

If it is determined that a storage unit is not empty, then the process 400 may return to step 402 until it is determined that one or more storage units are empty and in which containers may be placed.

If, however, it is determined that a storage unit is empty, then the process 400 may proceed to instruct de-illumination of the container complete indicator and the container remove indicator for the storage unit, as at 404. For example, responsive to a determination that a container is not present within a modular unit, a controller may instruct the container complete button and indicator and the container removal indicator associated with first and second faces, respectively, of the modular unit to be turned off, or to transition to a steady, always-off state. In this manner, the container complete button and indicator and the container removal indicator of the modular unit may not be illuminated, such that one or more agents may not place objects in the modular unit.

The process 400 may continue to instruct placement of an empty container in the storage unit, as at 406. For example, responsive to a determination that a container is not present within a modular unit, a controller may instruct or provide an indication to one or more agents to place a container in the empty modular unit. The controller may provide an indication to place a container to a first agent performing various processes associated with the first face of the modular unit, and/or may provide an indication to place a container to a second agent performing various processes associated with the second face of the modular unit.

The process 400 may then proceed by determining whether an empty container is detected in the storage unit by the container presence sensor and/or the scale, as at 408. For example, based on data received from a container presence sensor that indicates a presence or absence of a container within a modular unit, and/or based on data received from a scale that indicates a presence or absence of a container within a modular unit, a controller may determine whether an empty container has been placed and is present within a particular modular unit. Various types of sensors may be associated with a modular unit to detect the presence or absence of a container within the modular unit.

If it is determined that a container is not detected in the storage unit, then the process 400 may return to step 406 until it is determined that a container has been placed and is present within the storage unit.

If, however, it is determined that a container is detected in the storage unit, then the process 400 may proceed to instruct illumination of the container complete indicator and the container remove indicator for the storage unit, as at 410. For example, responsive to a determination that a container is present within a modular unit, a controller may instruct the container complete button and indicator and the container removal indicator associated with first and second faces, respectively, of the modular unit to be turned on, or to transition to a steady, always-on state. In this manner, the container complete button and indicator and the container removal indicator of the modular unit may be illuminated, such that one or more agents may place objects in the modular unit.

The process 400 may also continue to tare a scale associated with the storage unit, as at 412. For example, responsive to a determination that a container is present within a modular unit, a controller may tare, or zero out, a scale associated with the modular unit, such that weights of one or more objects placed in the container within the modular unit may be detected by the scale. Thereafter, the process 400 may return to step 402 to continue to determine whether one or more storage units are empty and in which containers may be placed.

Figure 5:
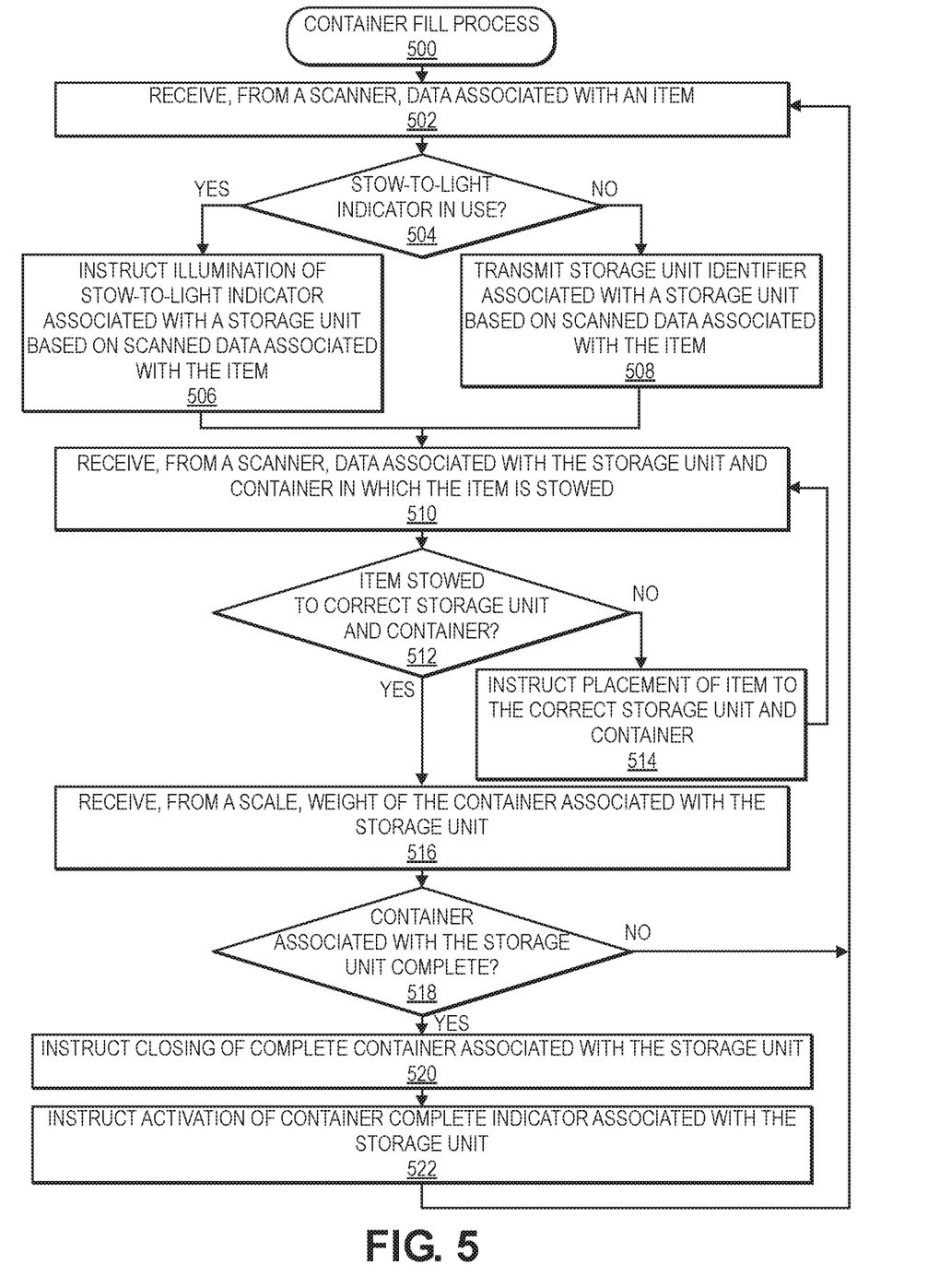
FIG. 5 is a flow diagram illustrating an example container fill process, in accordance with implementations of the present disclosure.

Various containers placed within modular units, as described with respect to FIG. 4, may then receive one or more objects, as described with respect to FIG. 5.

FIG. 5 is a flow diagram illustrating an example container fill process 500, in accordance with implementations of the present disclosure.

The process 500 may begin by receiving, from a scanner or scanning device, data associated with an item. For example, a controller may receive data associated with an item based on a barcode, QR code, number, symbol, character, or other identifier that may be scanned by a scanner, scanning device, imaging device, or other similar device. The scanning device may be a handheld scanner, and may also include various input/output elements, including one or more buttons, a screen, touchscreen, or other display, or other interactive elements. Based on the data associated with a scanned item, a controller may determine an identification, type, size, shape, weight, or other properties or characteristics of the item or object, e.g., by referencing a database of information for various items or objects. Further, based on the determined properties or characteristics of the item or object, a controller may identify a particular modular unit and container as a placement location for the scanned item.

The process 500 may continue by determining whether a stow-to-light indicator is in use, as at 504. For example, a controller may determine whether a stow-to-light indicator is operational and associated with the particular modular unit and container in which the scanned item is to be placed. Based on data associated with the particular modular unit and container, a controller may determine whether a stow-to-light indicator is associated with the modular unit, e.g., by referencing a database of information for various modular units and containers.

If it is determined that a stow-to-light indicator is in use, then the process 500 may proceed by instructing illumination of the stow-to-light indicator associated with a storage unit based on the scanned data associated with the item, as at 506. For example, a controller may instruct the stow-to-light indicator associated with the particular modular unit and container to illuminate, e.g., steady, flashing, or other visual indications. In this manner, the stow-to-light indicator of the modular unit may be illuminated, such that an agent may place the scanned item in the modular unit and container.

If, however, it is determined that a stow-to-light indicator is not in use, then the process 500 may continue to transmit a storage unit identifier associated with a storage unit based on the scanned data associated with the item, as at 508. For example, a controller may instruct a display or screen proximate the modular unit, such as a display associated with the scanning device, a display associated with a first face of the modular unit, or any other display proximate the agent, the modular unit, and/or the containerization system, to display a modular unit identifier, which may correspond to the identifier 116 associated with the modular unit described herein. In this manner, an agent may correlate the identifier displayed by the screen with the modular unit identifier 116 associated with a first face of the modular unit in order to place the item in the identified modular unit and container.

Then, the process 500 may proceed with receiving, from a scanner or scanning device, data associated with the storage unit and container in which the item is stowed, as at 510. For example, a controller may receive data associated with a modular unit based on a barcode, QR code, number, symbol, character, or other identifier, which may correspond to the identifier 116 associated with the modular unit described herein, that may be scanned by a scanner, scanning device, imaging device, or other similar device. The scanning device may be a handheld scanner, and may also include various input/output elements, including one or more buttons, a screen, touchscreen, or other display, or other interactive elements.

Based on the data associated with the scanned modular unit, the process 500 may continue with determining whether the item was stowed to the correct storage unit and container, as at 512. For example, a controller may compare the scanned modular unit identifier 116 with stored information associated with the modular unit and container. If the scanned modular unit identifier 116 and the stored information associated with the modular unit do not match, then the process 500 may proceed by instructing placement of the item to the correct storage unit and container, as at 514. For example, a controller may alter illuminations of stow-to-light indicators of the incorrect modular unit in which the item was placed and/or the correct modular unit in which the item should be placed to visually indicate a correct placement of the item, and/or a controller may provide additional information and/or identifiers via one or more displays or screens to facilitate correct placement of the item by one or more agents. The process 500 may then return to step 510 as described above.

If, however, the scanned modular unit identifier 116 and the stored information associated with the modular unit do match, then the process 500 may continue by receiving, from a scale, a weight of the container associated with the storage unit, as at 516. For example, a controller may receive data associated with a weight of the container to determine when the container is full or complete, and/or may compare or verify the detected weight of one or more items or objects with stored data associated with weights of items or objects to continually update and improve stored information associated with items.

The process 500 may then determine whether the container associated with the storage unit is complete, as at 518. For example, a controller may determine that a container is complete based on meeting or exceeding a weight threshold, e.g., 15 kilograms, or other weight threshold. In other example embodiments, a controller may determine that a container is complete based on lack of physical space within a container, a number of items or objects placed within the container, a defined group of items or objects placed within the container, or various other thresholds or criteria.

If it is determined that the container is not full or complete, then the process 500 may return to step 502 to receive data associated with another item and continue the container filling process until one or more containers is determined to be full or complete.

If, however, it is determined that the container is full or complete, then the process 500 may proceed to instruct closing of the complete container associated with the storage unit, as at 518. For example, a controller may instruct or provide an indication to one or more agents to close the complete container such that the container may be removed from the modular unit.

The process 500 may then continue to instruct activation of the container complete indicator associated with the storage unit, as at 520. For example, a controller may instruct or provide an indication to one or more agents to activate or press the container complete indicator in order to cause removal of the container from the modular unit and transfer of the container to various downstream stations and/or processes. In some example embodiments, as described herein, a controller may substantially automatically instruct activation of the container complete indicator responsive to determining that the container is full or complete, e.g., based on a detected weight of the container, based on a number of items placed in the container, based on a defined group of items placed within the container, or various other thresholds or criteria. The activation of the container complete indicator may comprise a flashing or intermittent illumination of the container complete indicator. In this manner, the container complete button and indicator of the modular unit may be activated, such that one or more agents may not place any additional objects in the container within the modular unit.

Thereafter, the process 500 may return to step 502 to continue to receive data associated with another item and continue the container filling process until one or more additional containers is determined to be full or complete.

Figure 6:
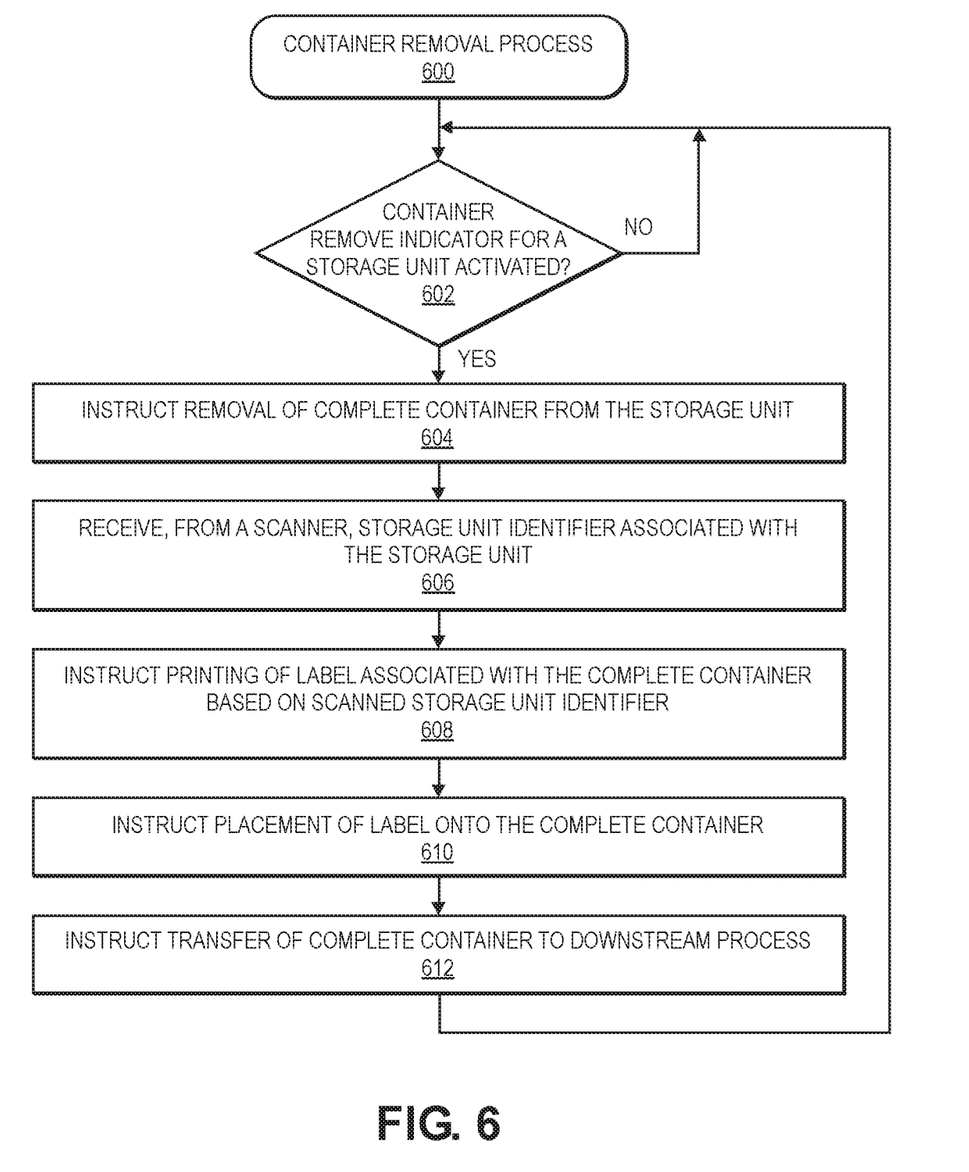
FIG. 6 is a flow diagram illustrating an example container removal process, in accordance with implementations of the present disclosure.

Various containers within modular units that have received one or more objects and that are determined to be full or complete, as described with respect to FIG. 5, may then be removed from the modular units, as described with respect to FIG. 6.

FIG. 6 is a flow diagram illustrating an example container removal process 600, in accordance with implementations of the present disclosure.

The process 600 may begin by determining whether a container remove indicator for a storage unit is activated, as at 602. For example, responsive to activation or pressing of the container complete indicator of a modular unit, a controller may instruct or provide an indication to one or more agents by activating the container removal indicator in order to cause removal of the container from the modular unit and transfer of the container to various downstream stations and/or processes. In some example embodiments, as described herein, a controller may substantially automatically instruct activation of the container removal indicator and the container complete indicator responsive to determining that the container is full or complete, e.g., based on a detected weight of the container, based on a number of items placed in the container, based on a defined group of items placed within the container, or various other thresholds or criteria. The activation of the container removal indicator may comprise a flashing or intermittent illumination of the container removal indicator. In this manner, the container removal indicator of the modular unit may be activated, such that one or more agents may remove the complete container from within the modular unit.

If it is determined that a container remove indicator for a storage unit is not activated, the process 600 may return to step 602 to continue to determine whether a container remove indicator for a storage unit is activated.

If, however, it is determined that a container remove indicator for a storage unit is activated, then the process 600 may continue by instructing removal of the complete container from the storage unit, as at 604. For example, a controller may instruct or provide an indication to one or more agents to remove the complete container from the modular unit. In addition, as described above, responsive to removing the container from the modular unit, a controller may instruct the container complete button and indicator and the container removal indicator associated with first and second faces, respectively, of the modular unit to be turned off, or to transition to a steady, always-off state. In this manner, the container complete button and indicator and the container removal indicator of the modular unit may not be illuminated, such that one or more agents may not place objects in the modular unit.

The process 600 may proceed by receiving, from a scanner or scanning device, a storage unit identifier associated with the storage unit, as at 606. For example, a controller may receive data associated with a modular unit based on a barcode, QR code, number, symbol, character, or other identifier, which may correspond to the identifier 116 associated with the modular unit described herein, that may be scanned by a scanner, scanning device, imaging device, or other similar device. The scanning device may be a handheld scanner, and may also include various input/output elements, including one or more buttons, a screen, touchscreen, or other display, or other interactive elements.

The process 600 may continue to instruct printing of a label associated with the complete container based on the scanned storage unit identifier, as at 608. For example, based on the data associated with the scanned modular unit, a controller may determine a destination, such as a storage location, a shipping destination, a customer location, or other destination associated with the container, e.g., by referencing a database of information for various containers and corresponding objects. Further, various information associated with the container and corresponding objects, including a destination, may be printed on the label using a printer, label maker, or other printing device.

The process 600 may then proceed to instruct placement of the label onto the complete container, as at 610. For example, a controller may instruct or provide an indication to one or more agents to place, affix, fasten, adhere, couple, or otherwise attach the label onto the complete container.

The process 600 may then continue with instructing transfer of the complete container to a downstream process, as at 612. For example, a controller may instruct or provide an indication to one or more agents to transfer the container to one or more downstream stations and/or processes, such as packing, sorting, storage, shipping, or other processes, which may be based at least in part on information printed on the label and information associated with the container and/or objects placed therein.

Thereafter, the process 600 may return to step 602 to continue to determine whether a container remove indicator for another storage unit is activated, in order to remove the container from another modular unit and transfer the container to one or more downstream stations or processes.

Figure 7:
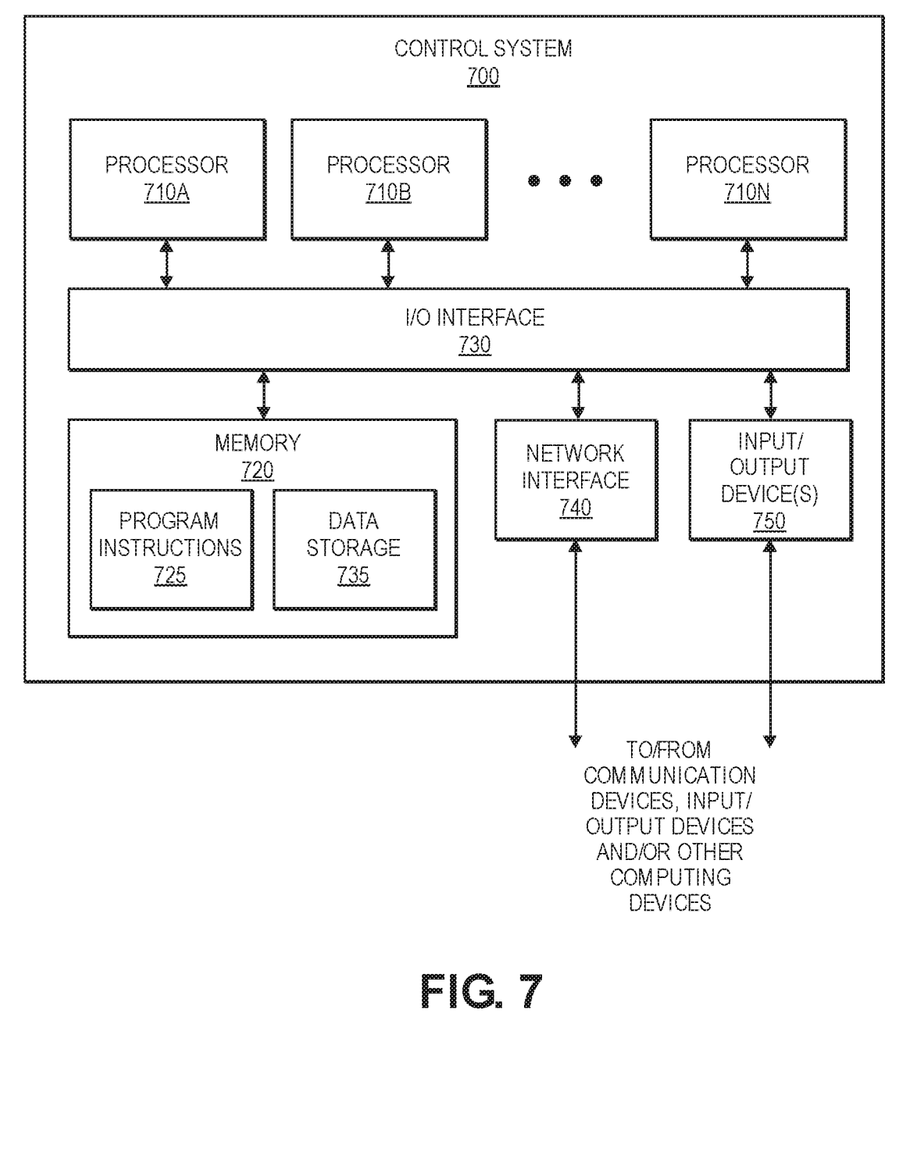
FIG. 7 is a block diagram illustrating an example control system, in accordance with implementations of the present disclosure.

FIG. 7 is a block diagram illustrating an example control system 700, in accordance with implementations of the present disclosure.

Various operations of a control system, such as those described herein, may be executed on one or more computer systems, and/or interacting with various other computers, systems, or devices in a material handling facility, according to various implementations. For example, the control system discussed above may function and operate on one or more computer systems. One such control system is illustrated by the block diagram in FIG. 7. In the illustrated implementation, a control system 700 includes one or more processors 710A, 710B through 710N, coupled to a non-transitory computer-readable storage medium 720 via an input/output (I/O) interface 730. The control system 700 further includes a network interface 740 coupled to the I/O interface 730, and one or more input/output devices 750. In some implementations, it is contemplated that a described implementation may be implemented using a single instance of the control system 700 while, in other implementations, multiple such systems or multiple nodes making up the control system 700 may be configured to host different portions or instances of the described implementations. For example, in one implementation, some data sources or services (e.g., related to portions of modular containerization systems, operations, or processes, etc.) may be implemented via one or more nodes of the control system 700 that are distinct from those nodes implementing other data sources or services (e.g., related to other portions of modular containerization systems, operations, or processes, etc.).

In various implementations, the control system 700 may be a uniprocessor system including one processor 710A, or a multiprocessor system including several processors 710A-710N (e.g., two, four, eight, or another suitable number).

The processors 710A-710N may be any suitable processor capable of executing instructions. For example, in various implementations, the processors 710A-710N may be general-purpose or embedded processors implementing any of a variety of instruction set architectures (ISAs), such as the x86, PowerPC, SPARC, or MIPS ISAs, or any other suitable ISA. In multiprocessor systems, each of the processors 710A-710N may commonly, but not necessarily, implement the same ISA.

The non-transitory computer-readable storage medium 720 may be configured to store executable instructions and/or data accessible by the one or more processors 710A-710N. In various implementations, the non-transitory computer-readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 720 as program instructions 725 and data storage 735, respectively. In other implementations, program instructions and/or data may be received, sent or stored upon different types of computer-accessible media, such as non-transitory media, or on similar media separate from the non-transitory computer-readable storage medium 720 or the control system 700. Generally speaking, a non-transitory, computer-readable storage medium may include storage media or memory media such as magnetic or optical media, e.g., disk or CD/DVD-ROM, coupled to the control system 700 via the I/O interface 730. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 740.

In one implementation, the I/O interface 730 may be configured to coordinate I/O traffic between the processors 710A-710N, the non-transitory computer-readable storage medium 720, and any peripheral devices, including the network interface 740 or other peripheral interfaces, such as input/output devices 750. In some implementations, the I/O interface 730 may perform any necessary protocol, timing or other data transformations to convert data signals from one component (e.g., non-transitory computer-readable storage medium 720) into a format suitable for use by another component (e.g., processors 710A-710N). In some implementations, the I/O interface 730 may include support for devices attached through various types of peripheral buses, such as a variant of the Peripheral Component Interconnect (PCI) bus standard or the Universal Serial Bus (USB) standard, for example. In some implementations, the function of the I/O interface 730 may be split into two or more separate components, such as a north bridge and a south bridge, for example. Also, in some implementations, some or all of the functionality of the I/O interface 730, such as an interface to the non-transitory computer-readable storage medium 720, may be incorporated directly into the processors 710A-710N.

The network interface 740 may be configured to allow data to be exchanged between the control system 700 and other devices attached to a network, such as other control systems, material handling system controllers, warehouse management systems, other computer systems, robotic arms, machines, or systems, various types of sensors, various types of processing aids or indicators, upstream stations or processes, downstream stations or processes, other material handling systems or equipment, or between nodes of the control system 700. In various implementations, the network interface 740 may support communication via wired or wireless general data networks, such as any suitable type of Ethernet network.

Input/output devices 750 may, in some implementations, include one or more displays, projection devices, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 700. Multiple input/output devices 750 may be present in the control system 700 or may be distributed on various nodes of the control system 700. In some implementations, similar input/output devices may be separate from the control system 700 and may interact with one or more nodes of the control system 700 through a wired or wireless connection, such as over the network interface 740.

As shown in FIG. 7, the memory 720 may include program instructions 725 that may be configured to implement one or more of the described implementations and/or provide data storage 735, which may comprise various tables, data stores and/or other data structures accessible by the program instructions 725. The program instructions 725 may include various executable instructions, programs, or applications to facilitate modular containerization operations and processes described herein, such as programmable logic controllers, robotic arm, machine, or apparatus controllers, drivers, or applications, sensor controllers, drivers, or applications, sensor data processing applications, processing aid or indicator controllers, drivers, or applications, material handling equipment controllers, drivers, or applications, upstream station controllers, drivers, or applications, downstream station controllers, drivers, or applications, etc. The data storage 735 may include various data stores for maintaining data related to systems, operations, or processes described herein, such as modular containerization systems, modular units (or storage units), modular unit data, robotic arms, machines, or apparatus, sensors, sensor data, processing aids or indicators, displays, screens, or other visual input/output devices, containers, container data, items or objects, item or object data, material handling equipment, apparatus, or systems, upstream systems, stations, or processes, downstream systems, stations, or processes, etc.

Those skilled in the art will appreciate that the control system 700 is merely illustrative and is not intended to limit the scope of implementations. In particular, the control system and devices may include any combination of hardware or software that can perform the indicated functions, including computers, network devices, internet appliances, robotic devices, etc. The control system 700 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 4-6, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A modular containerization system, comprising:
a plurality of modular units removably coupled together to form the modular containerization system, each modular unit including:
a frame configured to receive a shipping bag;
a bag presence sensor configured to detect a presence of the shipping bag;
a scale associated with a base of the frame and configured to detect a weight of a plurality of objects placed within the shipping bag;
a stow-to-light indicator associated with a front face of the frame and configured to illuminate to direct placement of the plurality of objects within the shipping bag;
a bag full button positioned on the front face of the frame and configured to be pressed responsive to completion of placement of the plurality of objects within the shipping bag; and
a bag removal indicator positioned on a rear face of the frame and configured to activate to direct removal of the shipping bag responsive to pressing of the bag full button;
wherein each of the plurality of modular units is in communication with a controller associated with the modular containerization system, the controller configured to at least:
determine that a respective shipping bag is present within a modular unit based on data received from a respective bag presence sensor;
cause illumination of a respective stow-to-light indicator of the modular unit based on data associated with an object;
determine that the respective shipping bag is full based on data received from a respective scale;
detect activation of a respective bag full button of the modular unit subsequent to determining that the respective shipping bag is full; and
cause activation of a respective bag removal indicator to direct removal of the respective shipping bag from the modular unit responsive to activation of the respective bag full button.

2. The modular containerization system of claim 1, wherein the controller is further configured to at least:
determine that the respective shipping bag is absent from within the modular unit based on data received from the respective bag presence sensor;
responsive to determining that the respective shipping bag is absent:

cause de-illumination of an indicator associated with the respective bag full button of the modular unit; and cause de-illumination of the respective bag removal indicator of the modular unit.

3. The modular containerization system of claim 2, wherein the controller is further configured to at least:

instruct placement of the respective shipping bag within the modular unit;

responsive to determining that the respective shipping bag is present:

cause illumination of the indicator associated with the respective bag full button of the modular unit; and cause illumination of the respective bag removal indicator of the modular unit.

4. The modular containerization system of claim 1, wherein the controller is further configured to at least:

determine that the object is placed in the respective shipping bag based on data associated with the respective shipping bag and the data associated with the object.

5. A system, comprising:

a plurality of modular units removably coupled together to form a modular containerization system, each modular unit including:

a frame configured to receive a container;

a container presence sensor configured to detect a presence of the container;

a container complete button positioned on a first face of the frame and configured to be pressed responsive to completion of placement of at least one object within the container; and a container removal indicator positioned on a second face of the frame and configured to activate to direct removal of the container responsive to pressing of the container complete button.

6. The system of claim 5, wherein each modular unit further includes:

a reflective surface associated with a portion of the frame;

wherein the container presence sensor is configured to detect the presence of the container based on an occlusion of the reflective surface by the container.

7. The system of claim 6, wherein each modular unit further includes:

a scale associated with a base of the frame and configured to detect a weight of the at least one object placed within the container.

8. The system of claim 7, wherein each modular unit further includes:

a stow-to-light indicator associated with the first face of the frame and configured to illuminate to direct placement of the at least one object within the container.

9. The system of claim 8, further comprising:

a controller associated with the modular containerization system;

wherein each of the plurality of modular units is at least one of in communication with the controller or receives power from the controller.

10. The system of claim 9, wherein the controller is configured to at least:

determine that a respective container is absent from within a respective modular unit based on data received from a respective container presence sensor;

responsive to determining that the respective container is absent:

cause de-illumination of an indicator associated with a respective container complete button of the respective modular unit; and cause de-illumination of a respective container removal indicator of the respective modular unit.

11. The system of claim 9, wherein the controller is configured to at least:

determine that a respective container is present within a respective modular unit based on data received from a respective container presence sensor;

responsive to determining that the respective container is present:

cause illumination of an indicator associated with a respective container complete button of the respective modular unit; and cause illumination of a respective container removal indicator of the respective modular unit.

12. The system of claim 11, wherein the controller is configured to at least:

responsive to determining that the respective container is present:

tare a respective scale associated with the base of the respective modular unit.

13. The system of claim 9, wherein the controller is configured to at least:

receive, from a scanning device, data associated with the at least one object;

determine a respective container of a respective modular unit in which the at least one object is to be placed;

instruct placement of the at least one object in the respective container of the respective modular unit based on the data associated with the at least one object; and receive, from the scanning device, data associated with the respective modular unit.

14. The system of claim 13, wherein the controller is configured to at least:

instruct placement of the at least one object in the respective container of the respective modular unit by causing illumination of a respective stow-to-light indicator of the respective modular unit based on the data associated with the at least one object.

15. The system of claim 9, wherein the controller is configured to at least:

determine that a respective container of a respective modular unit is complete;

detect activation of a respective container complete button of the respective modular unit; and cause activation of a respective container removal indicator to direct removal of the respective container from the respective modular unit responsive to activation of the respective container complete button.

16. The system of claim 15, wherein the controller is configured to at least:

determine that the respective container of the respective modular unit is complete by:

receiving, from a respective scale, a weight associated with the respective container of the respective modular unit; and determining that the respective container is complete based on the weight.

17. The system of claim 15, wherein the controller is configured to at least:

receive, from a scanning device, data associated with the respective modular unit;

cause printing of a label to be applied to the respective container removed from the respective modular unit based on the data associated with the respective modular unit; and instruct application of the label to the respective container and transfer of the respective container to a downstream station.

\* \* \* \* \*